(12) United States Patent
DeGaillard

(10) Patent No.: US 6,460,921 B2
(45) Date of Patent: Oct. 8, 2002

(54) OPENABLE MOTOR VEHICLE ROOF

(75) Inventor: Francois DeGaillard, Mouilleron en Pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/794,241

(22) Filed: Feb. 28, 2001

(65) Prior Publication Data

US 2001/0040394 A1 Nov. 15, 2001

(30) Foreign Application Priority Data

Feb. 29, 2000 (DE) .......................... 100 09 437
Feb. 29, 2000 (DE) .......................... 100 09 436

(51) Int. Cl.[7] ................................ B60J 7/047
(52) U.S. Cl. .................. 296/218; 296/220.01
(58) Field of Search ............ 296/216.02–216.04, 296/220.01, 218

(56) References Cited

U.S. PATENT DOCUMENTS

| | | | | |
|---|---|---|---|---|
| 3,333,889 A | * | 8/1967 | Golde | 296/106 X |
| 4,063,774 A | * | 12/1977 | Hanks | 296/216.04 |
| 4,272,121 A | * | 6/1981 | Kim | 296/216.04 |
| 4,630,858 A | * | 12/1986 | Bez | 296/216.04 X |
| 4,786,102 A | * | 11/1988 | Sakamoto et al. | 296/218 X |
| 5,029,937 A | * | 7/1991 | Yamamoto | 296/220.01 X |
| 6,158,803 A | * | 12/2000 | Reihl et al. | 296/216.04 |

FOREIGN PATENT DOCUMENTS

| | | |
|---|---|---|
| DE | 44 13 704 A1 | 1/1996 |
| DE | 197 01 211 C1 | 2/1998 |
| DE | 197 13 347 C1 | 5/1999 |
| DE | 199 08 253 A1 | 9/2000 |
| EP | 0 531 881 A2 | 3/1993 |
| JP | 5-112136 | 5/1993 |
| JP | 406191436 * 7/1994 | .......... 296/216.04 |

OTHER PUBLICATIONS

Patents Abstracts of Japan, M–884, Oct. 26, 1989, vol. 13/No. 473, Mazda Motor Corp. & JP 1–186427, Jul. 25, 1989, English Abstract.
Patents Abstracts of Japan, M–1143, Aug. 6, 1991, vol. 15/No. 307, OI Seisakusho Co. Ltd., & JP 3–112723, May 14, 1991, English Abstract.

* cited by examiner

*Primary Examiner*—Dennis H. Pedder
(74) *Attorney, Agent, or Firm*—Nixon Peabody LLP; David S. Safran

(57) ABSTRACT

An openable motor vehicle roof with a fixed roof structure having front and rear roof openings, a front roof system which covers the front roof opening and which includes at least one roof cover which is selective movable in a pivoting position such that its rear edge is positioned above the fixed roof structure and which can be moved longitudinally to at least partially expose the front roof opening. The openable motor vehicle roof further includes a rear roof system which has at least one roof cover which in a closed position covers the rear roof opening over a cargo space in the rear area of the motor vehicle and at least partially clears the rear roof opening in an at least partially opened position.

5 Claims, 3 Drawing Sheets

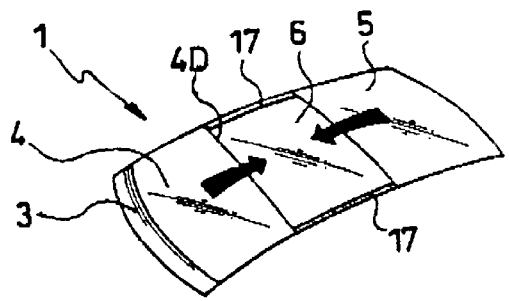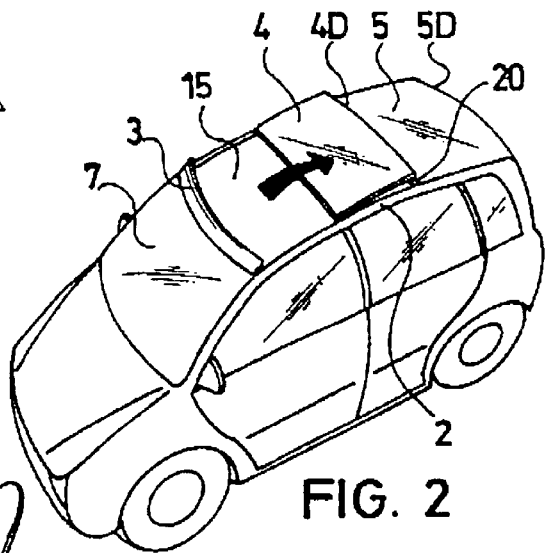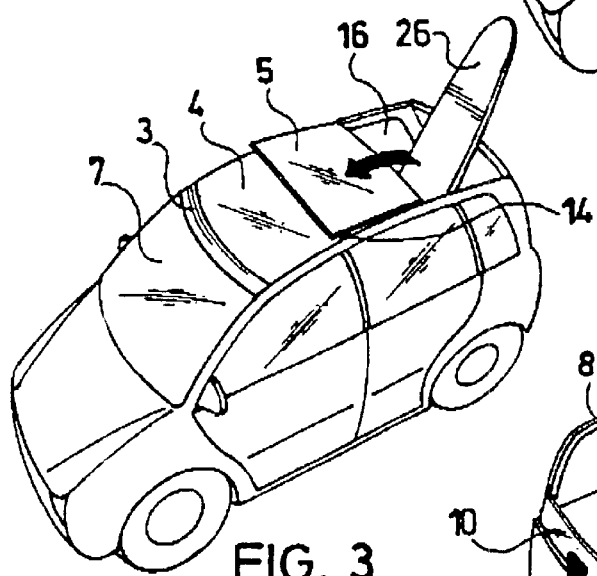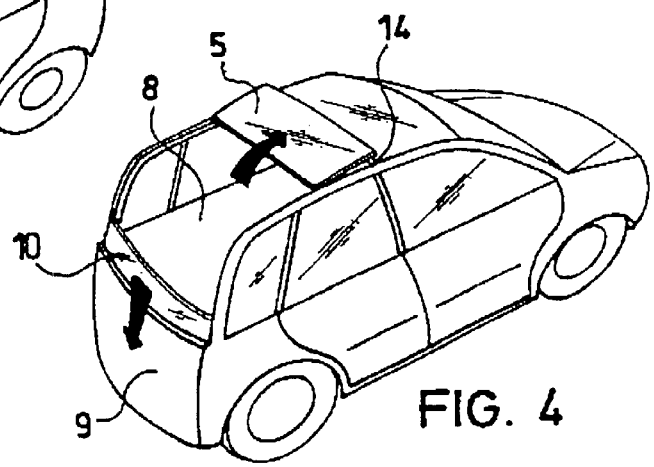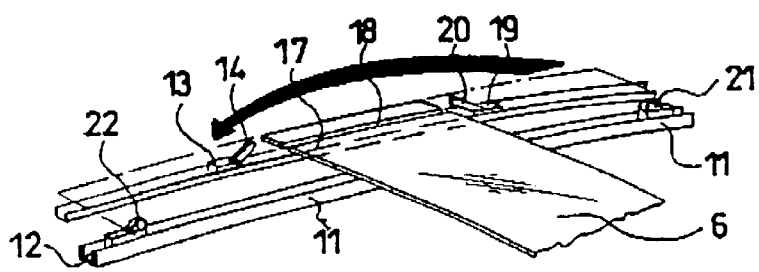

OPENABLE MOTOR VEHICLE ROOF

BACKGROUND OF THE INVENTION

1. Field of the Invention

The present invention relates generally to motor vehicle roofs with a fixed vehicle roof structure and a roof opening. More particularly, the present invention relates to an openable motor vehicle roof having a fixed roof structure having front and rear roof openings, at least one front roof panel which has a closed position in which the front roof panel covers the front roof opening, the front roof panel being selectively movable from the closed position to at least partially expose the front roof opening such that a rear edge of the front roof panel cover is displaced over the fixed roof structure. The openable vehicle roof further includes at least one rear roof panel which has a closed position in which the rear roof panel covers the rear roof opening over a cargo space in the rear area of the motor vehicle.

2. Description of Related Art

Published European Patent Application EP 0 531 881 A1 discloses a motor vehicle roof with two covers which are located in succession in a solid motor vehicle roof. The two covers can be actuated by a single drive, but actuation can take place separately for each cover. Furthermore, motor vehicles are known in which a rear window in a rear hatch can be separately lowered to facilitate access to the rear cargo space of the motor vehicle especially for stowing bulky articles. Published German Patent Application DE 197 13 347 A1 discloses an externally guided sliding roof in which the rear edge of the cover is supported by separate support levers which can be moved on sliding elements in guides which are located laterally outside the roof opening.

SUMMARY OF THE INVENTION

An object of the present invention is to provide an motor vehicle roof which in a closed position, allows selectively variable light incidence.

A second object of the present invention is to provide such a motor vehicle roof with enhanced ventilation of the interior of the motor vehicle interior.

A third object of the present invention is to provide such a motor vehicle roof with facilitates easy loading of a cargo space in the interior of the motor vehicle.

These and other objects are achieved by providing an openable motor vehicle roof having a rear roof system located in a rear area behind a fixed roof structure and includes at least one rigid cover which covers a rear roof opening to thereby enable a large loading opening in the motor vehicle roof for stowage of bulky articles. Loading of the cargo space is simplified by the rear cover part with its rear edge directly bordering an essentially vertical vehicle body part such as a rear hatch, a rear door or a rear window of the motor vehicle. Thus, by lowering the rear window into the rear door or the rear hatch with the rear cover open, a continuous opening can be attained which includes the rear roof area and half the height of the rear door. Thus, the cargo area is cleared similarly to a pick-up truck for loading from the rear and at the top.

Moreover, located in front of the fixed roof structure is a front roof system with at least one cover which can be moved above or below the solid motor vehicle roof and which can be raised with its rear edge over the solid motor vehicle roof. This combination of two conventional roof systems makes it possible to protect the cover which has been pushed forward by the cover of the front roof system raised with its rear edge against incoming wind forces. Furthermore, for improved through-ventilation of the motor vehicle interior the covers of the two roof systems can be opened at least into a pivoted ventilation position. To simplify loading, it is advantageous if the rear cover part with its rear edge directly borders the rear hatch, the rear door or the rear window of the motor vehicle. Therefore, by lowering the rear window into the rear door, the rear hatch or the rear window with the rear cover part open, a continuous opening can be attained which includes the rear roof area and half the height of the rear door. Thus, the cargo area is cleared similarly to a pick-up truck for loading from the rear and at the top. Another advantageous aspect of the present invention is to allow the cover of the front roof system to be completely raised higher with its rear edge than the opened cover(s) of the rear roof system. In this way, an airstream is routed completely over and beyond the rear cover(s).

Between the two roof systems there is advantageously a fixed roof structure with a length which corresponds preferably to the front cover or the rear cover. Accordingly, the stability of the motor vehicle is increased by the connection between the side members. In addition, one of the covers at a time can be completely opened in a position such that it is placed over or under the middle area of the motor vehicle roof, while the other cover can be moved at least into one raised position, but preferably likewise into an at least partially shifted position.

An exemplary embodiment of the present invention includes a front roof system which is an externally guided sliding roof with a cover supported proximate its rear edge by support levers which have bottom ends. The bottom ends are supported on sliding elements which can be moved on guides which lie laterally outside the roof opening. The use of an externally guided sliding roof thereby enables comfortable clearance of a large front roof opening as long as the rear cover part has not reached a certain degree of opening. Accordingly, the motor vehicle has a dual use for the user: with the front roof system opened, it offers the advantage of a large sliding roof, with the rear roof system opened, it offers generous access to the cargo space, and at the same time with the front cover raised provides air ventilation.

Moreover, in accordance with an exemplary embodiment of the present invention, the front and the rear roof system is preferably driven via separate electric drives which are triggered by a common control device such that the cover of the front roof system can be only raised in a longitudinal direction when the rear roof system has reached at least a certain partial degree of opening. Therefore, the control device assumes the task of preventing collisions between the separate roof systems. According to one embodiment, the cover of the front roof system is lifted into its raised position as soon as the control device receives a signal for opening the rear roof system at least for a certain partial degree of opening. In this way, the front cover can be used as a wind deflector for the opened rear cover part.

Finally, it is advantageous if the front roof system is preceded by a wind deflector louver which is pivoted into a raised position as soon as the cover of the front roof system has reached at least a certain partial degree of opening. This embodiment also effectively protects the front roof opening with the front cover moved at least partially to the rear against draft and wind noise.

BRIEF DESCRIPTION OF THE DRAWINGS

FIG. 1 shows a schematic perspective view of a motor vehicle roof in accordance with the present invention;

FIG. 2 shows a perspective view of the motor vehicle roof as shown in FIG. 1 with the front cover opened;

FIG. 3 shows a perspective view of the motor vehicle roof as shown in FIG. 1 with the rear cover opened;

FIG. 4 shows a perspective view of the motor vehicle roof as shown in FIG. 3 with the rear window additionally lowered;

FIG. 5 shows a perspective view of the left side member;

DETAILED DESCRIPTION OF THE PREFERRED EMBODIMENTS

Figure 6:
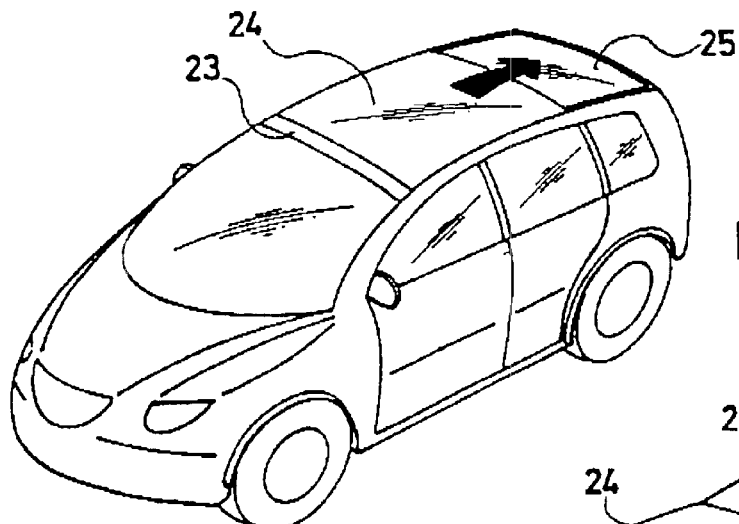
FIG. 6 shows a perspective view of an embodiment of a motor vehicle roof with a rear lifting roof.

FIGS. 1 through 5 show a motor vehicle roof 1 including a fixed roof structure 6, a front window 7 which adjoins a wind deflector louver 3, a front cover 4 of an externally-guided sliding roof which forms the front roof system, and a rear cover panel 5 of a rear roof system which is likewise made as an externally-guided sliding roof which opens from back to front with respect to the front cover 4. As shown in FIG. 2, the externally guided front sliding roof with its panel 4 and the externally-guided rear sliding roof with its rear panel 5 are bordered laterally by side members 2. Disposed between the two roof systems is an area 6 of the solid motor vehicle roof 1 having a length, when viewed in the longitudinal direction of the motor vehicle, that is substantially equal to the panel 4 or the panel 5.

As shown in FIG. 4, a rear edge 5D of the rear panel 5 directly borders the top edge of a rear window 10 which is supported to be lowered into the rear of a rear door 9 or rear hatch. As shown in FIG. 2, in a raised state, the panel 4 of the externally guided sliding roof in the area of its rear edge 4D is supported by a support lever 20 on each side. As shown in FIG. 5, the lower end of the support lever 20 is pivotably supported on a sliding element 19 which is guided to move longitudinally in a guide channel 18. The guide channel 18 is formed in the guide rail 17 which is supported on the side member 2. The guide channel 18 is opened to the top for the emergence of the support lever 20 and is covered, with the panel 4 closed, by two sealing elements (not shown) and which are located on either side on the top edge of the guide channel 18.

The sealing elements (not shown) are each provided with a sealing lip which, with the panel 4 closed and the support lever 20 lowered, tightly adjoin one another and completely cover the guide channel 18 to the top. When the rear edge 4D of the panel 4 is raised, the support lever 20 assumes its support function, and thus, emerges past the sealing lips to the top over the solid motor vehicle roof 1. Thus, the sealing lips diverge to the side and conform to the support lever 20.

Viewed from the side member 2 to the inside, the guide rail 17 in the area of the front roof opening 15 or the rear roof opening 16 adjoins a guide rail 11, in the guide channel 12 of which the front sliding element 21 of the front panel 4 or the rear sliding element 22 of the rear panel 5 is supported to be able to move longitudinally. The front sliding element 21 supports the front pivoting axis of the panel 4 and the rear sliding element 22 supports the rear pivoting axis of the panel 5. In an opened state, the front panel 4 is thereby supported to the front area via its pivoting axis on the sliding elements 21 and in the rear area by means of the support lever 20. The front panel 4 is moved by the stable support in the area of its rear edge so far to the rear that approximately ninety percent of the front roof opening 15 is cleared.

The rear panel 5 is supported in the area of its rear edge via a pivot axis on the sliding elements 22. In the area of the front edge, support is effected via the support levers 14 having lower ends that are supported on sliding elements 13 which are guided in the guide channel 18 of the guide rail 17 when the rear panel 5 is moved forward. Accordingly, the mechanism of moving the rear panel 5 corresponds essentially to the mechanism for the front panel 4, however, they differ solely in that the rear panel 5 is actuated in a reverse direction, specifically, from back to front with respect to the front panel 4.

In FIG. 3, shows the rear roof system with the panel 5 in completely opened state whereby the panel 5 is moved from back to front. In this way, the rear roof opening 16 is almost completely cleared, i.e., to approximately ninety percent. With the simultaneous lowering of the rear window 10 into the rear door 9 or the rear hatch, a loading opening is cleared which includes not only the rear roof area, but also the top area of the rear motor vehicle covering. In this way, a rear cargo area 8 is formed having an area which corresponds roughly to that of a pick-up truck, thereby, bulky cargo can be loaded in the cargo surface 8. As shown in FIG. 3, the opened rear roof opening 16 already enables a generous loading possibility for long articles, for example, a surfboard 26, as cargo. To support long articles on the rear edge of the roof opening 16, a bow can be inserted which is attached laterally in the area of the guide rails 11.

The panel 5 which is pushed to the front is effectively protected against an oncoming airstream by the panel 4 which is raised in several intermediate stages up to as far as the completely raised position. The position of the rear edge 4D of the panel 4 in the completely raised state is higher than the raised front edge of the panel 5 such that an airstream is guided completely over and beyond the rear panel 5. The rear roof opening 16 is, thus, also effectively protected against the draft of the airstream.

As shown in FIG. 2, when the front panel 4 is in an opened state, the rear panel 5 is completely closed. Conversely, the front panel 4 of the externally guided sliding roof is raised with its rear edge, the function of the support lever 20 being suggested at the same time. The front panel 4 can be moved almost completely to the rear over the rear panel 5 to provide a clearance for the front roof opening 15. This is possible because the guide rails 17 for the panel 4 or the support lever 20 are located laterally outside the guide rails 11. Moreover, to protect the front roof opening 15 likewise against the draft when the panel 4 is opened, the wind deflector louver 3 is raised.

Figure 7:
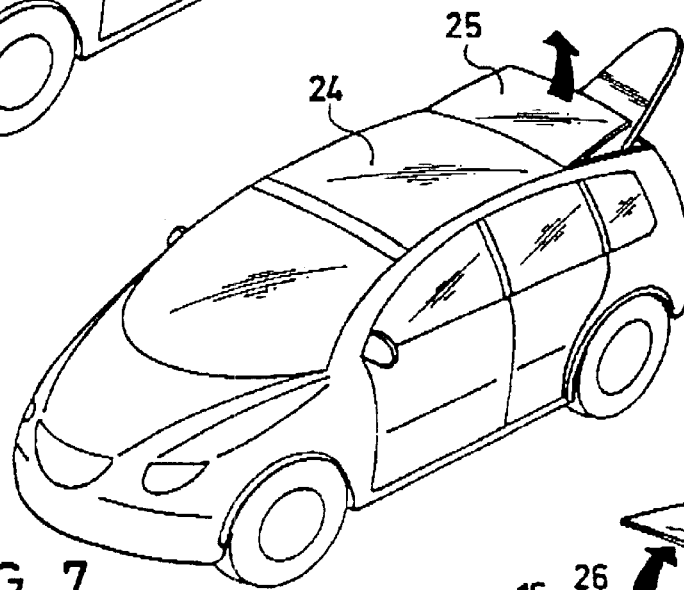
FIG. 7 shows a perspective view of a motor vehicle roof as shown in FIG. 6 with the rear cover raised.
Figure 8:
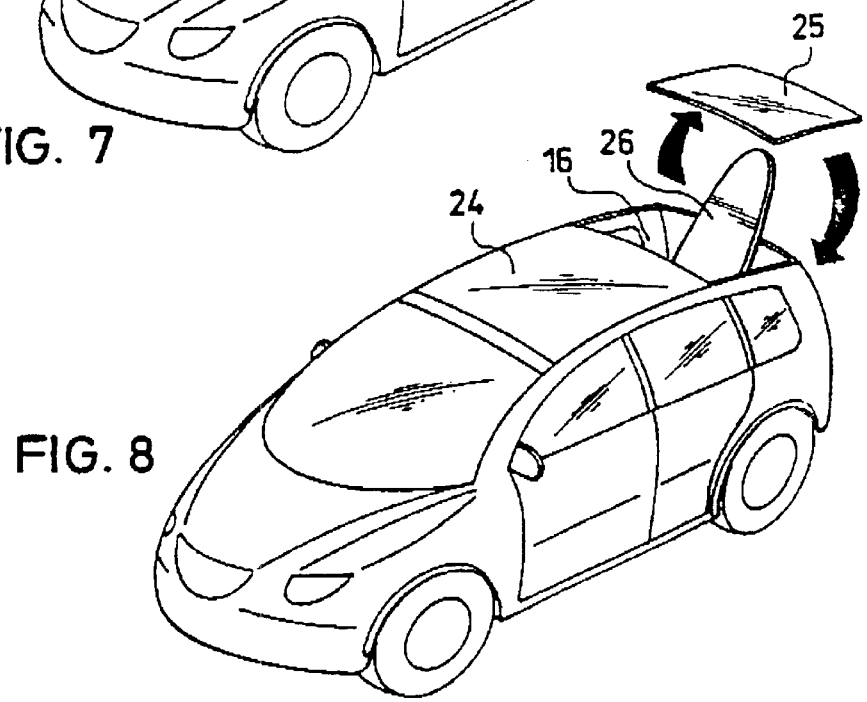
FIG. 8 shows a perspective view of a motor vehicle roof as shown in FIG. 6 with the rear cover removed.

In a second embodiment shown in FIGS. 6 to 8, the rear roof system is formed by a lifting roof with a panel 25 which can be raised with its rear edge, and in accordance with another option, the rear roof opening 16 can be completely removed from the motor vehicle roof. The panel 25 is preceded by the large panel 24 of the externally guided sliding roof. By way of the panel 24, a large front roof opening can be cleared when the panel 24 is moved to the rear over the panel 25 in the same manner and structure as the panel 4 in the first embodiment, i.e., on guide rails (not shown). In turn, the panel 24 is preceded by a wind deflector louver 23 which routes an airstream over and beyond the front roof opening when the panel 24 is pushed at least partially to the rear. As shown in FIG. 8, when the rear panel 25 is raised, and especially when it is completely removed, the motor vehicle can be loaded with long articles such a s a surfboard 26.

Figure 9:
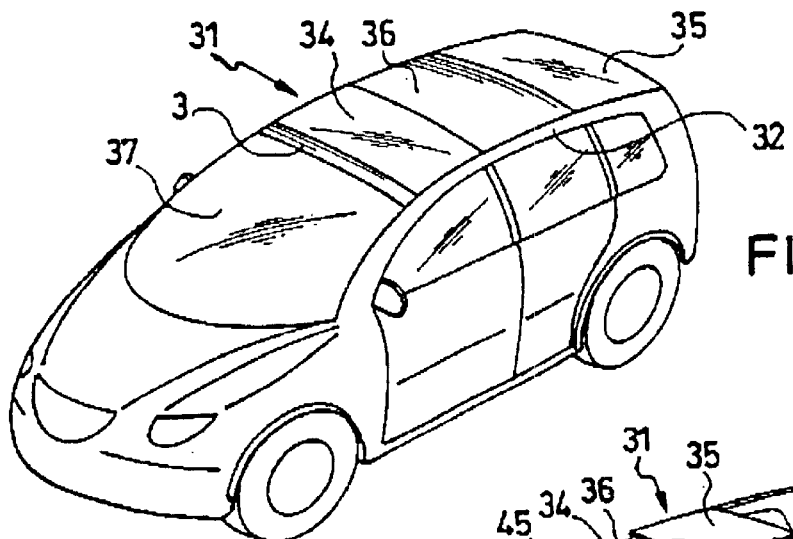
FIG. 9 shows a perspective view of a motor vehicle roof with a front openable roof system, a wind deflector louver, and a rear roof system which lies behind the area of the solid motor vehicle roof.
Figure 10:
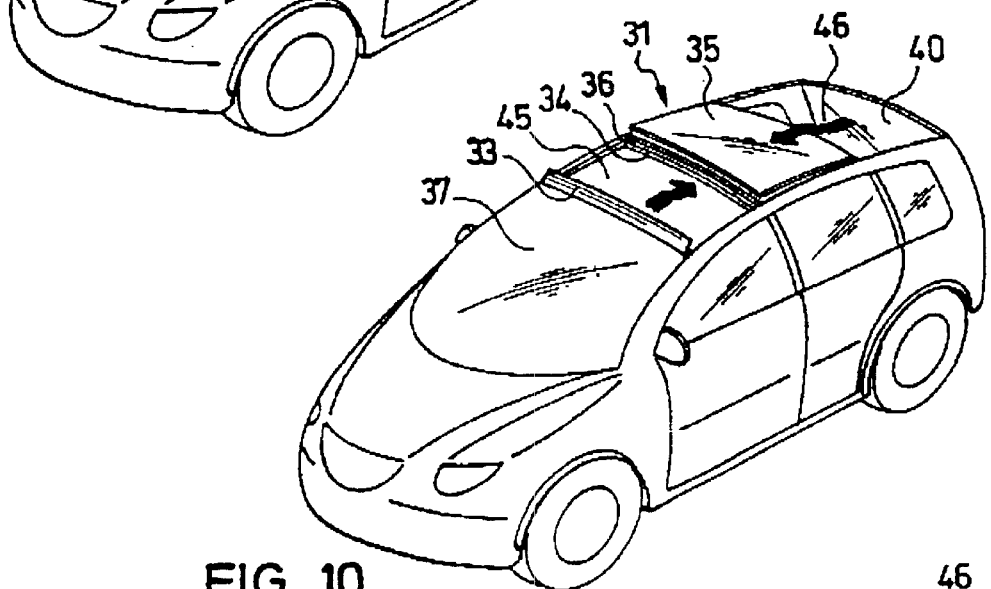
FIG. 10 shows a perspective view of the motor vehicle roof as shown in FIG. 9 in which the opened front cover is made as a sliding and lifting roof and the rear cover is made as an externally-guided sliding roof.
Figure 11:
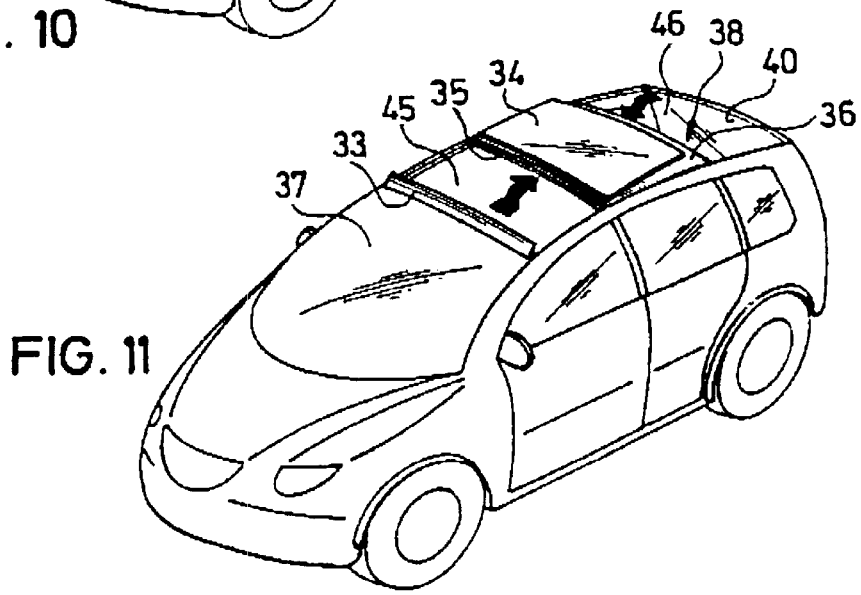
FIG. 11 shows a perspective view of the motor vehicle roof as shown in FIG. 9 in which the opened front cover is made as an externally guided sliding roof and the rear cover is made as a sliding and lifting roof.

As shown in FIGS. 9 to 11, a motor vehicle roof system 31 includes a wind deflector louver 33 which adjoins a front window 37, a front panel 34 and a rear panel 35. Disposed between the front panel 34 and the rear panel 35 is an area 36 of the solid motor vehicle roof 31 having a length which, when viewed in the longitudinal direction of the vehicle, is approximately the same as the lengths of both the front panel 34 and the rear panel 35. The rear edge of the rear panel 35 directly borders the top edge of the rear window 40 which is supported to be lowered into a bottom area of a rear door or rear hatch.

In the embodiment shown in FIG. 10, the front panel 34 of the front roof system is made as a sliding and pivoting roof that can be lowered or raised in a conventional manner with its rear edge over the solid motor vehicle roof 31 and can be moved to the rear underneath the level of the solid motor vehicle roof 31. The rear panel 35 of the rear roof system is made as an externally guided sliding roof, the rear panel 35, however, opening from back to front with respect to the front panel 34. The front sliding and lifting roof with its panel 34 and the externally guided rear sliding roof with its rear panel 35 are bordered laterally by the side members 32.

As shown in FIGS. 10 and 11, the rear roof system with the rear panel 35 is completely opened, the panel 35 having moved from back to front. In this way the rear roof opening 46 is almost completely cleared, i.e., approximately ninety percent. With the simultaneous lowering of the rear window 40 into the rear door or the rear hatch, a loading opening is cleared which includes not only the rear roof area, but also the top part of the rear motor vehicle covering. Accordingly, a rear cargo area 38 is formed which corresponds roughly to that of a pick-up truck, thereby, bulky cargo can be loaded into the cargo area 38. The opened rear roof opening 46 enables a generous loading possibility for long articles, for example, a surfboard, as cargo. To support long articles on the rear edge of the roof opening 46, a bow can be inserted which can be attached laterally in the area of the guide rails.

The rear panel 35 which is pushed to the front can be effectively protected against an oncoming airstream by the front panel 34 which can be raised from several intermediate stages to as far as the completely raised position. The position of the rear edge of the front panel 34 in the completely raised state is preferably somewhat higher than the raised front edge of the panel 35 such that an airstream is routed completely over and beyond the rear panel 35. The rear roof opening 46 is, thus, also effectively protected against an airstream draft.

For the opened state, which is shown in FIG. 10, the rear panel 35 is opened. The front panel 34 is lowered to clear the front roof opening 45 and is moved to the rear almost completely under the rear panel 35 or the area 36 of the solid motor vehicle roof 31 which lies therebetween. This is possible because the guide rails for the front panel 34 or its support lever are located laterally outside the guide rails of the rear panel 35. To protect the front roof opening 45 likewise against the draft, with the front panel 34 opened a wind deflector louver 33 is raised.

As shown in FIG. 11, the front panel 34 of the front roof system in this embodiment is made as an externally guided sliding roof. In a raised state, the front panel 34 in the area of its rear edge is supported by one support lever on each side. The lower end of the support lever is pivotally mounted on a sliding element which is guided to be able to move longitudinal in a guide channel. The guide channel is made in a guide rail which is supported on the side member 32. The guide channel is opened to the top for the emergence of the support lever and is covered, with the front panel 34 closed, by two sealing elements (not shown) and which are located on either side on the top edge of the guide channel.

The sealing elements each are provided with a sealing lip which, with the front panel 34 closed and the support lever lowered, tightly adjoin one another and completely cover the guide channel to the top. When the rear edge of the front panel 34 is raised, the support lever assumes its support function, and thus, emerges past the sealing lips to the top over the solid motor vehicle roof 31. The sealing lips, thus, diverge to the side and conform to the support lever.

Viewed from the side member 32 to the inside, the guide rail for the support lever of the externally guided sliding roof, in the area of the front roof opening 45 or the rear roof opening 46, adjoins a guide rail, in the guide channel of which the front sliding element of the front panel 34 or the front and the rear sliding element of the rear panel 35 is supported to be able to move longitudinally. The front sliding element is used to support the front pivoting axis of the panel 34. The rear sliding element is used to support the rear pivoting axis of the panel 35. In the opened state, the front panel 34 is, thus, supported in the front area via its pivoting axis on the front sliding elements and in the rear area by means of the support lever. The front panel 34 can be moved by the stable support in the area of its rear edge so far to the rear that approximately ninety percent of the front roof opening 45 are cleared.

The rear panel 35 is supported in the area of its rear edge via its pivot axis on the slide elements. In the area of the front edge, support is effected via the conventional mechanism of a sliding and lifting roof which is supported on sliding elements which likewise are guided, when the rear panel 35 is moved forward, in the guide rail on the edge of the rear roof opening 46. The difference from a conventional sliding and lifting roof consists in the reversed arrangement and the displacement to open in the direction of travel.

The motor vehicle roof which has been described combines the advantages of a externally guided sliding roof with those of a second rear roof system for the special purpose of clearing a rear cargo area. While the present invention provides a sliding roof system, the present invention is not limited to such a system and may reasonably encompass other systems, for example, instead of the externally guided sliding roof, a spoiler roof can also be used for the front or the rear roof system. Moreover, instead of a sliding and lifting roof a simple sliding roof can also be used.

What is claimed is:

1. A motor vehicle roof comprising:
   a fixed roof structure having a roof opening which extends from near a windshield boundary area of the roof to a rear window boundary area of the roof;
   a large front roof panel which has a closed position in which said front roof panel covers front and central portions of said roof opening above a passenger seating area in an interior area of a motor vehicle;

a small rear roof panel which has a closed position in which said rear roof panel covers a rear portion of said roof opening above a cargo space in a rear area of said interior of a motor vehicle, said at least one rear roof panel being selectively movable from the closed position thereof to at least partially open said rear portion of the roof opening;

wherein said front roof panel is selectively movable from the closed position thereof to a position over said rear roof panel to at least partially expose said front portion of the roof opening; and wherein said rear roof panel includes a rigid cover having a front edge which rests adjacent a rear edge of the front roof panel in said closed position and having a rear edge which rests adjacent at least one of a rear window, a rear hatch and a rear door of the motor vehicle while in said closed position; and wherein said rear roof panel is detachable to fully expose said rear portion of the roof opening.

2. The motor vehicle roof as claimed in claim 1, wherein said front roof panel is externally guided and supported proximate said rear edge by a plurality of support levers supported on sliding elements that are movable on a guide rail which rests laterally outside of said front and central portions of said roof opening.

3. The motor vehicle roof as claimed in claim 2, wherein said front roof panel is selectively movable to be raised such that said rear edge rests above said rear roof panel.

4. The motor vehicle roof as claimed in claim 1, further comprising a wind deflector louver positioned proximate to a front edge of said front roof panel, said wind deflector louver pivoting outwardly once said front roof panel is at least partially opened.

5. The motor vehicle roof as claimed in claim 1, wherein said rear roof panel is pivotable outwardly such that a rear edge of said at least one rear roof panel is positioned higher than said at least one of a rear window, a rear hatch and a rear door of the motor vehicle.

* * * * *